(12) United States Patent
Shu et al.

(10) Patent No.: US 10,726,515 B2
(45) Date of Patent: *Jul. 28, 2020

(54) HYBRID RENDERING SYSTEMS AND METHODS

(71) Applicant: Intel Corporation, Santa Clara, CA (US)

(72) Inventors: Kangyuan Shu, Shanghai (CN); Junyong Ding, Shanghai (CN); Yongnian Le, Shanghai (CN); Weiliang Lion Lin, Shanghai (CN); Xuefeng Deng, Shanghai (CN); Yaojie Yan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,070

(22) Filed: Jul. 2, 2018

(65) Prior Publication Data
US 2019/0172174 A1 Jun. 6, 2019

Related U.S. Application Data

(63) Continuation of application No. 15/041,795, filed on Feb. 11, 2016, now Pat. No. 10,026,143, which is a
(Continued)

(51) Int. Cl.
*G06T 1/20* (2006.01)
*G06F 9/50* (2006.01)
*G06T 1/60* (2006.01)

(52) U.S. Cl.
CPC .............. *G06T 1/20* (2013.01); *G06F 9/5011* (2013.01); *G06F 9/5044* (2013.01); *G06T 1/60* (2013.01)

(58) Field of Classification Search
CPC ........ G06F 9/5011; G06F 9/5044; G06T 1/20; G06T 1/60
(Continued)

(56) References Cited

U.S. PATENT DOCUMENTS 8,199,158 B2 * 6/2012 Samson ................ G06F 1/3203
345/519
8,284,205 B2 * 10/2012 Miller .................... G06F 1/3203
345/502

(Continued)

FOREIGN PATENT DOCUMENTS

CN 1763784 4/2006
CN 101315703 12/2008
(Continued)

OTHER PUBLICATIONS

"International Application Serial No. PCT CN2012 079394, International Search Report dated May 9, 2013", 3 pgs.
(Continued)

*Primary Examiner* — Jacinta M Crawford
(74) *Attorney, Agent, or Firm* — Schwegman Lundberg & Woessner, P.A.

(57) ABSTRACT

Embodiments of a system and method for enhanced graphics rendering performance in a hybrid computer system are generally described herein. In some embodiments, a graphical element in a frame, application, or web page, which is to be presented to a user via a web browser, is rendered either by a first processor or a second processor based on indications of whether the first or the second processor is equipped or configured to provide faster rendering. A rendering engine may utilize either processor based on historical or anticipated rendering performance, and may dynamically switch between the hardware decoder and general purpose processor to achieve rendering time performance improvement.

(Continued)

Switches between processors may be limited to a fixed number switches or switching frequency.

18 Claims, 5 Drawing Sheets

Related U.S. Application Data continuation of application No. 13/995,223, filed as application No. PCT/CN2012/079394 on Jul. 31, 2012, now Pat. No. 9,262,795.

(58) Field of Classification Search
USPC .................................................. 345/501, 503
See application file for complete search history.

(56) References Cited

U.S. PATENT DOCUMENTS

| | | |
|---|---|---|
| 8,830,245 B2 | 9/2014 | Bone et al. |
| 9,262,795 B2 | 2/2016 | Shu et al. |
| 10,026,143 B2 | 7/2018 | Shu et al. |
| 2009/0027403 A1 | 1/2009 | Jung |
| 2009/0067509 A1* | 3/2009 | Poon ................... G09G 3/3648 375/240.26 |
| 2010/0328325 A1 | 12/2010 | Sevigny et al. |
| 2011/0310107 A1 | 12/2011 | Shiraki |
| 2012/0023110 A1 | 1/2012 | Zidan et al. |
| 2012/0149464 A1 | 6/2012 | Bone et al. |
| 2012/0192200 A1 | 7/2012 | Rao et al. |
| 2015/0130820 A1 | 5/2015 | Shu et al. |
| 2016/0335736 A1 | 11/2016 | Shu et al. |

FOREIGN PATENT DOCUMENTS

| | | |
|---|---|---|
| WO | 2012097178 | 7/2012 |
| WO | 2013119226 | 8/2013 |
| WO | 2014019127 | 2/2014 |

OTHER PUBLICATIONS

"International Application Serial No. PCT CN2012 079394, Written Opinion dated May 9, 2013", 6 pgs.
"U.S. Appl. No. 13/995,223, Non Final Office Action dated Apr. 3, 2015", 18 pgs.
"U.S. Appl. No. 13/995,223, Response filed Aug. 3, 2015 to Non Final Office Action dated Apr. 3, 2015", 13 pgs.
"U.S. Appl. No. 13/995,223, Preliminary Amendment filed Jun. 18, 2013", 9 pgs.
"U.S. Appl. No. 13/995,223, Notice of Allowance dated Oct. 6, 2015", 5 pgs.
"U.S. Appl. No. 13/995,223, PTO Response to Rule 312 Communication dated Jan. 8, 2016", 2 pgs.
"European Application Serial No. 12882446.3, Extended European Search Report dated Feb. 18, 2016", 16 pgs.
"European Application Serial No. 12882446.3 Communication pursuant to Article 94(3) EPC dated Nov. 16, 2016", 6 pgs.
"U.S. Appl. No. 15/041,795, Non Final Office Action dated May 5, 2017", 30 pgs.
"European Application Serial No. 12882446.3, Response filed May 22, 2017 to Communication pursuant to Article 94(3) EPC dated Nov. 16, 2016", 11 pgs.
"U.S. Appl. No. 15/041,795, Response filed Aug. 7, 2017 to Non Final Office Action dated May 5, 2017", 8 pgs.
"U.S. Appl. No. 15/041,795, Final Office Action dated Sep. 8, 2017", 31 pgs.
"U.S. Appl. No. 15/041,795, Response filed Feb. 8, 2018 to Final Office Action dated Sep. 8, 2017", 10 pgs.
"U.S. Appl. No. 15/041,795, Notice of Allowance dated Mar. 15, 2018", 12 pgs.
"U.S. Appl. No. 15/041,795, Examiner Interview Summary dated Mar. 16, 2018", 3 pgs.
"European Application Serial No. 12882446.3, Summons to Attend Oral Proceedings dated Apr. 8, 2019", 6 pgs.
"European Application Serial No. 12882446.3, Response filed Aug. 16, 2019 to Summons to Attend Oral Proceedings dated Apr. 8, 2019", 5 pgs.
"European Application Serial No. 12882446.3, Summons to Attend Oral Proceedings dated Dec. 5, 2019", 10 pgs.
Gregg, Chris, "Dynamic Heterogeneous Scheduling Decisions Using Historical Runtime Data", Retrieved from the Internet:URL:http: www.cs.virginia.edu ~mwb7w publications A4MMC_11_heterogeneous_scheduling.pdf[retrieved on Sep. 12, 2019], (Jun. 30, 2011), 12 pgs.
"European Application Serial No. 12882446.3, Response filed Apr. 9, 2020 to Summons to Attend Oral Proceedings dated Dec. 5, 2019", 12 pgs.

* cited by examiner

HYBRID RENDERING SYSTEMS AND METHODS

PRIORITY CLAIM TO RELATED APPLICATIONS

This application a continuation of U.S. application Ser. No. 15/041,795, filed Feb. 11, 2016, which is a continuation of U.S. application Ser. No. 13/995,223, filed Nov. 15, 2013, which is a national stage application under 35 U.S.C. § 371 of PCT/CN2012/079394, filed Jul. 31, 2012, and published as WO 2014/019127 on Feb. 6, 2014, all of which are incorporated by reference as if reproduced herein and made a part hereof in their entirety, and the benefit of priority of which is claimed herein.

BACKGROUND

User equipment (UE) may include computers, smart phones, cellular phones, laptops, tablet computers, set-top boxes, video game consoles, or other network or graphics display enabled devices. Such equipment may be configured to provide graphics rendering, Internet access, video playback and graphical user interfaces, but may have limited resources (e.g., processor capability, battery life, etc.). The resource limits of equipment may impact the ability of the equipment to provide timely graphics rendering and a smooth user interface (UI) response that is acceptable to users. The complexity of graphical user interfaces (GUI) is increasing, and users are increasingly demanding high quality performance from their equipment. Dedicated graphics acceleration hardware may enhance video playback performance; however not all platforms may currently maximize performance in all situations.

Graphics-related operations in a typical UE may be computationally intensive and may greatly affect overall system performance of UE. Such operations include manipulating images, drawing vector graphics, which are essential to a considerable number of typical usage scenarios such as web-browsing, playing games, displaying photo albums, visual editing tools, etc. These demands may slow down equipment response times, introduce overall system lag or unresponsiveness, and result in a user perception of low quality performance. The failure of UE to handle the performance needs of graphics operations may result in an undesirable user experience and user frustration.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
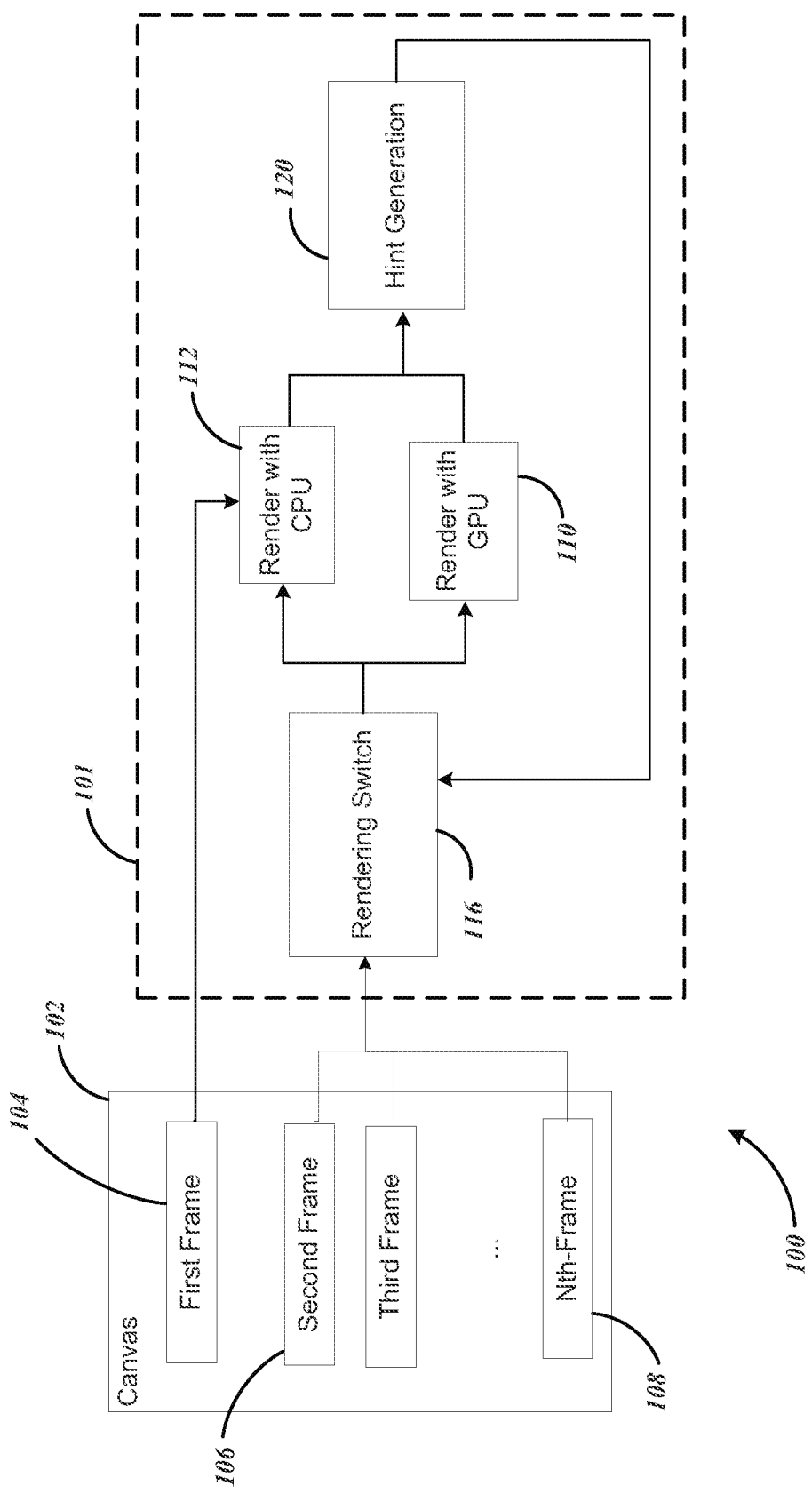
FIG. 1 is a block diagram illustrating a processing system with a rendering engine configured to dynamically switch between rendering paths, according to an embodiment.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Two-dimensional graphical element rendering is widely supported and useful component in modern mobile devices. For example, the two-dimensional canvas element included in a Hypertext Markup Language v.5 (HTML5) application interface allows application developers to invoke a broad range of two-dimensional graphics operations through application programming interfaces (APIs), such as those defined in the JavaScript language. Graphics operations may include, for example, manipulating images or drawing vector graphics, which may be useful in developing games, photo albums, visual editing tools, and the like. However, such graphics operations may generate an intermittent or continuously high demand for processing resources. The adoption and popularization of HTML5 may increase demand for graphics performance on user equipment in order to provide a smooth (e.g., uninterrupted) and satisfying user experience. In the context of mobile devices, the limited computation capability of a mobile central processing unit (CPU), such as a general purpose processor (GPP) available from ARM® or Intel®, may limit the ability to properly or quickly draw and render graphical content. Additionally, with the proliferation of mobile devices with cameras, sensors, and high speed network connections, HTML5 applications often produce and consume dramatically richer graphical content, such as high-resolution images (e.g., at a resolution of 640×480 pixels or finer) and high definition (HD) video.

CPU overloading may cause poor graphics performance, and the use of hardware graphics acceleration to render two-dimensional graphics is one approach to address such an overloading issue. For example, graphics acceleration may use a dedicated graphics processing unit (GPU) to draw and render the contents of a HTML5 Canvas received by the GPU as part of a web page or a mobile application. However, use of a GPU may not always be the fastest approach for every API supported by a device. For example, in certain cases, such as non-image and data-fetching operations, CPU rendering performance may be much better than GPU performance.

Typical web browsers utilize a media pipeline and web rendering engine to process and present graphical elements to a user. With complex network-based runtime applications, the rendering engine and a JavaScript engine may dominate the performance of most HTML5 applications. The rendering engine is responsible for drawing the contents and presenting them to the underlying window framework so that an operating system can show them on the display. The JavaScript engine executes the application's logic, which may be composed with JavaScript. Examples of rendering engines, also known as layout engines, include: Trident (used in at least version 9 of the Internet Explorer® web browser), Gecko® (used in the Firefox® web browser), and WebKit (used in the Apple® Safari® and Google Chrome™ web browsers). Typical browsers and web runtime implementations of HTML5 Canvas 2D rendering utilize a single GPU or CPU rendering solution, but not both, for the entire canvas and for the whole life cycle of the browser application. For example, a web browser may use either a single CPU or GPU rendering path for a web page or application, and never change paths during execution.

FIG. 1 is a block diagram illustrating a processing system 100 with a rendering engine 101 configured to dynamically switch between rendering paths, according to an embodiment. Graphics rendering performance may be improved by switching from CPU rendering to GPU rendering in a rendering scenario that is optimal for GPU rendering. A GPU only rendering solution may be faster than a CPU-only solution in image operation heavy scenarios, but the GPU solution may be slower in scenarios where the CPU frequently reads canvas data through APIs, such as provided by JavaScript. In an example, canvas 102 may include a first frame 104 that is rendered by a CPU, and subsequent frames 106, 108, that may be more efficiently rendered with a GPU. In an embodiment, canvas 102 may be a HTML5 Canvas2D with one or more graphics elements. In an embodiment, switching between GPU rendering 110 and CPU rendering 112 may improve graphics rendering efficiency.

As each frame is rendered performance data or "hints" may be generated by a hint generation module 120. Performance data, current rendering system statistics, a list of HTML5 Canvas 2D APIs processed, and any other performance indicators may be generated, collected, and stored by the hint generation module 120. A second frame 106 may be directed through either the GPU rendering path 112 or CPU rendering path 110, based on these performance data hints, predefined rules and any other necessary calculations as performed by a rendering switch 116. In an embodiment, the first frame 104 goes through the CPU path by default as because there may not be any hints available from the hint generation module at the beginning of a rendering session. Alternatively, the first frame 104 may also take GPU path 110 by default.

Figure 2:
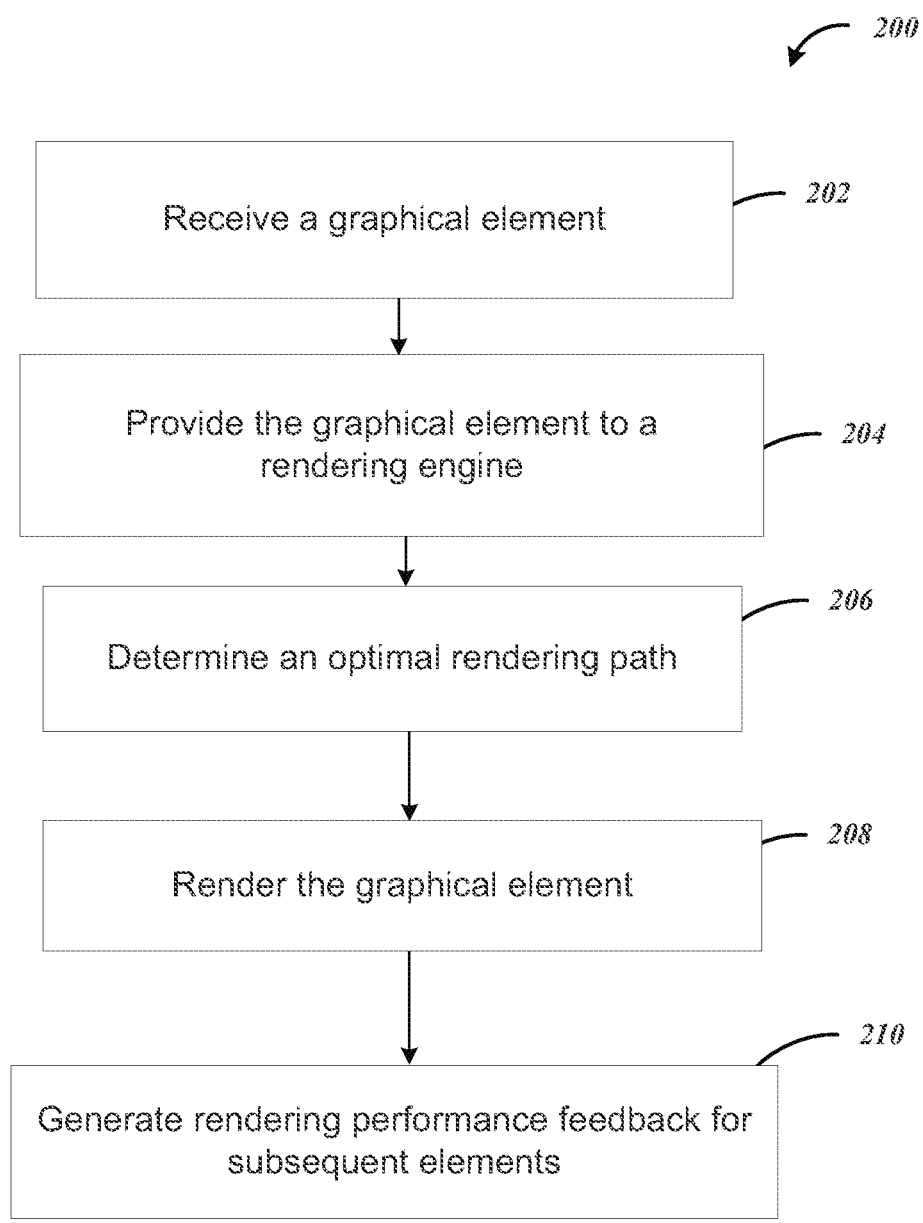
FIG. 2 is a flowchart illustrating an example scheme to present rendered graphical elements, according to an embodiment.

FIG. 2 is a flowchart illustrating an example scheme 200 to present rendered graphical elements, according to an embodiment. At 202, a graphical element, such one or more elements may be included in frame 106 of FIG. 1, is received. At 204, the graphical element is provided to a rendering engine, such as rendering engine 101. Rather than utilize only a CPU or GPU for rendering, at 206 a rendering switch 116 may check the rendering context of the rendering engine and the graphical element to be rendered during execution, and dispatch rendering tasks to either a CPU or a GPU intelligently, thereby allowing the rendering path to change dynamically. Dynamically switching between rendering paths may provide the maximum performance benefit of both paths, thus deliver improved performance in most rendering scenarios, such as those utilizing a HTML5 Canvas 2D. At 208, the graphical element is rendered by either the CPU or the GPU, or any other available processor that may be available and provide improved rendering performance. At 210, performance feedback, e.g., hints that may indicate actual hardware performance, may be generated for use in determining which path a subsequent graphical element should use to achieve the best rendering performance.

Several criterion may be monitored to generate the performance feedback or hints. For example, the details of a GPU rendering path, which may include a call list of historical rendering APIs executed by the GPU, or a performance characteristic of historical rendering APIs executed by GPU, each may be collected and utilized to determine an estimated execution time for specific API rendering operations. Similarly, details of CPU rendering path, which may include a call list of historical rendering APIs executed by CPU, or a performance characteristic of historical rendering APIs executed by CPU, may be collected and utilized to determine an estimated execution time for specific API rendering operations. These execution times may be referenced and compared contemporaneously as individual APIs are utilized to process and render a graphics element.

Additional criteria may include a record of switches between CPU and GPU rendering paths, any reasons the history switch was made, and any performance cost associated with the historical switches between the CPU and GPU. Furthermore, criteria may include details of a specific graphics operation to be executed, such as the amount of graphics instruction needed to add to graphics command buffer to complete the operation, the memory bandwidth needed for execution, the estimation of an amount of time required to complete the operation, and the most likely next rendering operation for a current frame as predicted by historical information or trends.

Hint criteria may also include real-time graphics system statistics, such as the available number of buffer slots to pipeline the commands to graphics hardware. Based on these hints and collected criteria, heuristic algorithms may be adopted to quickly determine whether a CPU or GPU rendering path is optimal. The switching algorithm may be based on predefined rules, such as always rendering a first frame with the CPU or always rendering a specific API with the GPU. The switching algorithm may also utilize additional calculations to make decision smarter.

Figure 3:
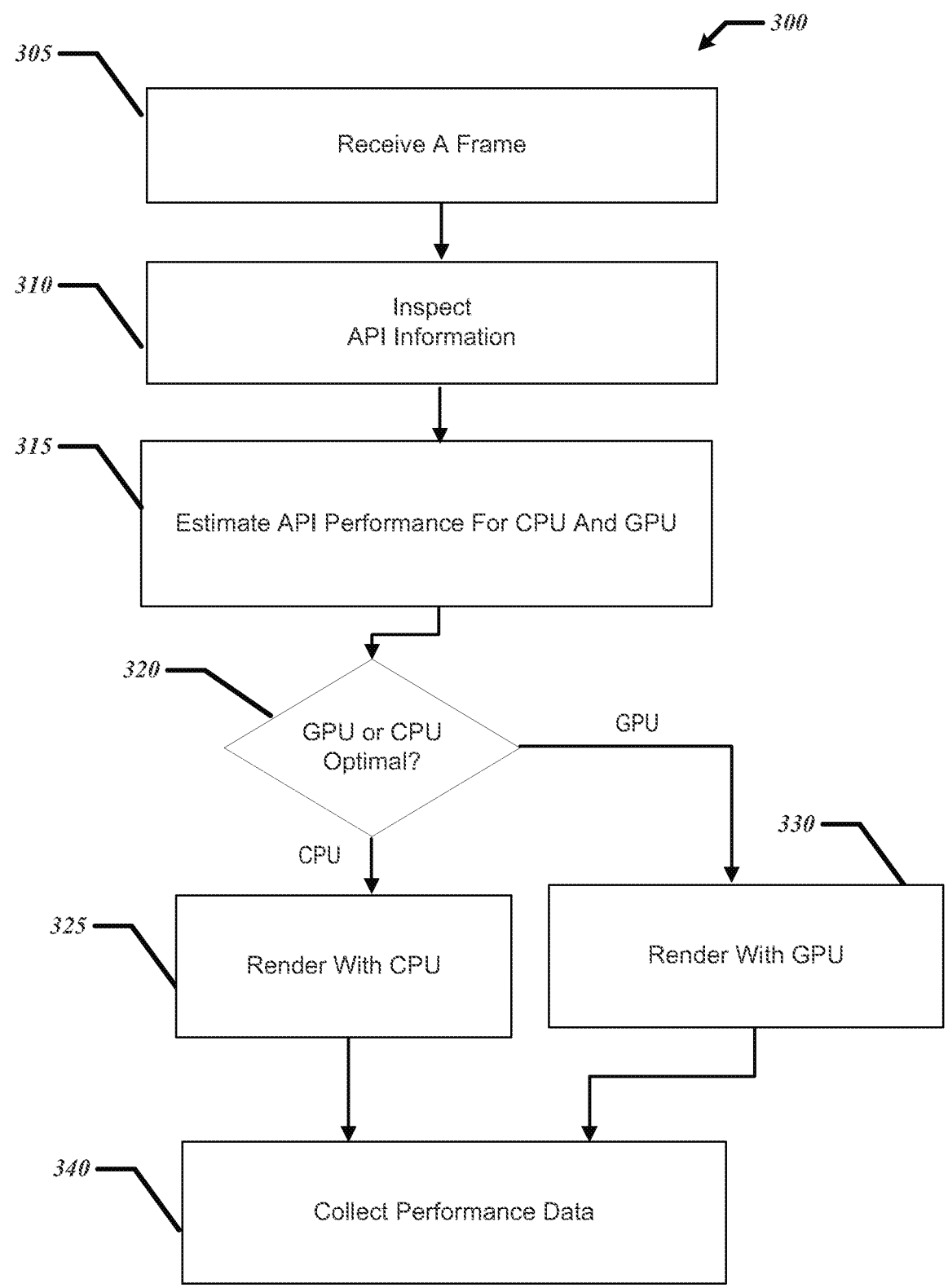
FIG. 3 is a flowchart illustrating a scheme to dynamically switch between graphical elements renderers, according to one embodiment.

FIG. 3 is a flowchart illustrating a scheme 300 to dynamically switch between graphical elements renderers, according to one embodiment. At 305 a new frame containing graphical elements that utilize, for example, a JavaScript HTML5 API are received. At 310, a rendering engine may inspect the frame for any available API information that may be useful in determining an optimal rendering path. At 315, a switching algorithm may be utilized estimate the execution time of any API for either of the GPU path or the CPU path, or both.

For example, the estimate may be performed based on a collection of historical profile data or by querying a database that include predefined or known performance data. Therefore, during the execution, for the frame to be rendered, the scheme 300 could further estimate the time spent on executing all canvas APIs for this frame if the alternate path was adopted. At 320, a determination of which of the alternative paths is fastest is made. If the CPU will provide the fastest performance, at 325, the element is rendered with a CPU. If the GPU is determined to provide the fastest performance, at 330, the element is rendered with a GPU.

At 340, actual performance data is collected. The actual performance data may be incorporated into the collection of historical profile data or the database of known data. In this manner, the dynamic switching between the CPU and GPU rendering paths during execution may be based on, and provide collected as facts or hints heuristics, that may be utilized for subsequent rendering determinations.

Figure 4:
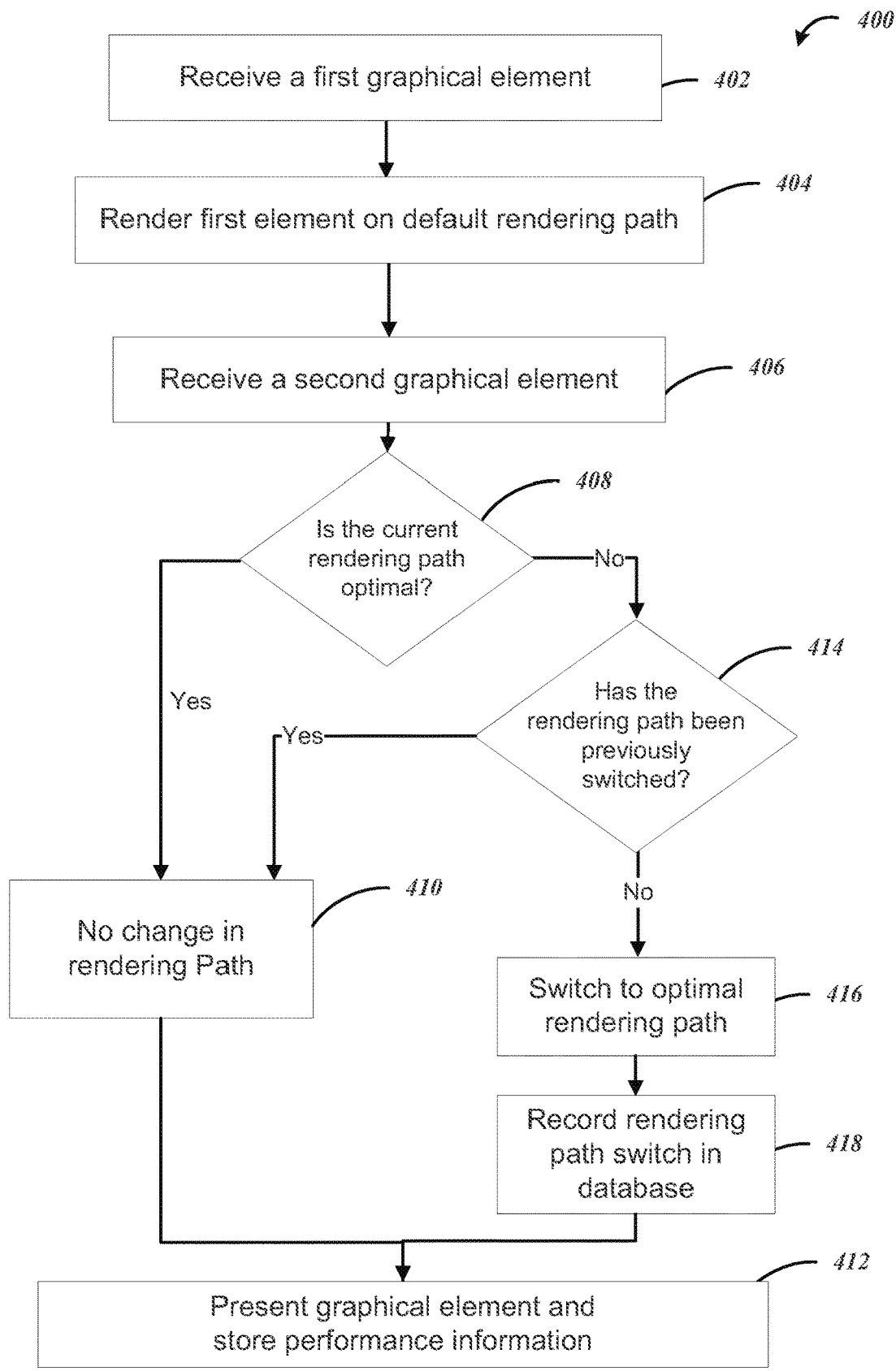
FIG. 4 is a flowchart illustrating a scheme to limit dynamic rendering path switches, according to one embodiment.

FIG. 4 is a flowchart illustrating a scheme 400 to limit dynamic rendering path switching, according to one embodiment. At 402, a first graphical element is received. At 404, the first graphical element is rendered on a default rendering path. The first rendering path may be selected based on a default setting, such as an assignment to always use a first processor (e.g., a CPU) to render a first frame. As discussed, the rendering performance of a first graphical element may provide hints or criteria for subsequent determinations of an optimal rendering path.

At 406 a second graphical element, or any number of subsequent graphical elements, is received. At 408, based on the rendering performance of a first graphical element, or any other previously encountered elements, a determination is made if the current rendering path is optimal. The current rendering path may be the initial default path, or any path that was previously utilized by a rendering engine to process a previous graphical element.

At 410, if the current rendering path is the optimal path no change in the rendering path is made, and at 412, the graphical element is presented on any display coupled to the rendering engine and any collected performance information is stored. If, at 408 a determination is made if the current rendering path is not optimal and improved rendering performance can be achieved with a second processor (e.g., a GPU) a second check, at 414, is performed that may include a query as to whether or not the current rendering path is the result of a previous switch. For example, in a scenario where successive API calls would each benefit from different processors the cost of frequent switching between the rendering paths (e.g., thrashing) may negate any performance improvement provided by utilizing the two separate processors. If, at 414 the current rendering path is the result of a switch, then at 410, no change to the rendering path is made. If, at 414, the current rendering path is not the result of a switch, then at 416, the rending path is switched to the optimal path. At 418, a record of the rending path switch is stored in a database, memory location, data collection, or other appropriate record for future reference.

Graphics performance, such as HTML5 rendering performance, is a key battlefield for mobile devices. Accordingly, mobile processor software developers may utilize these concepts and techniques to improve performance in their mobile device application by increasing the graphics rendering, e.g., HTML5 canvas rendering, performance for applications that include mobile processor equipped devices such as smart phones or tablet computers. Additionally, these concepts may be incorporated into desktop computer based browsers or web runtime software products, or for use on other platforms or form factors.

Figure 5:
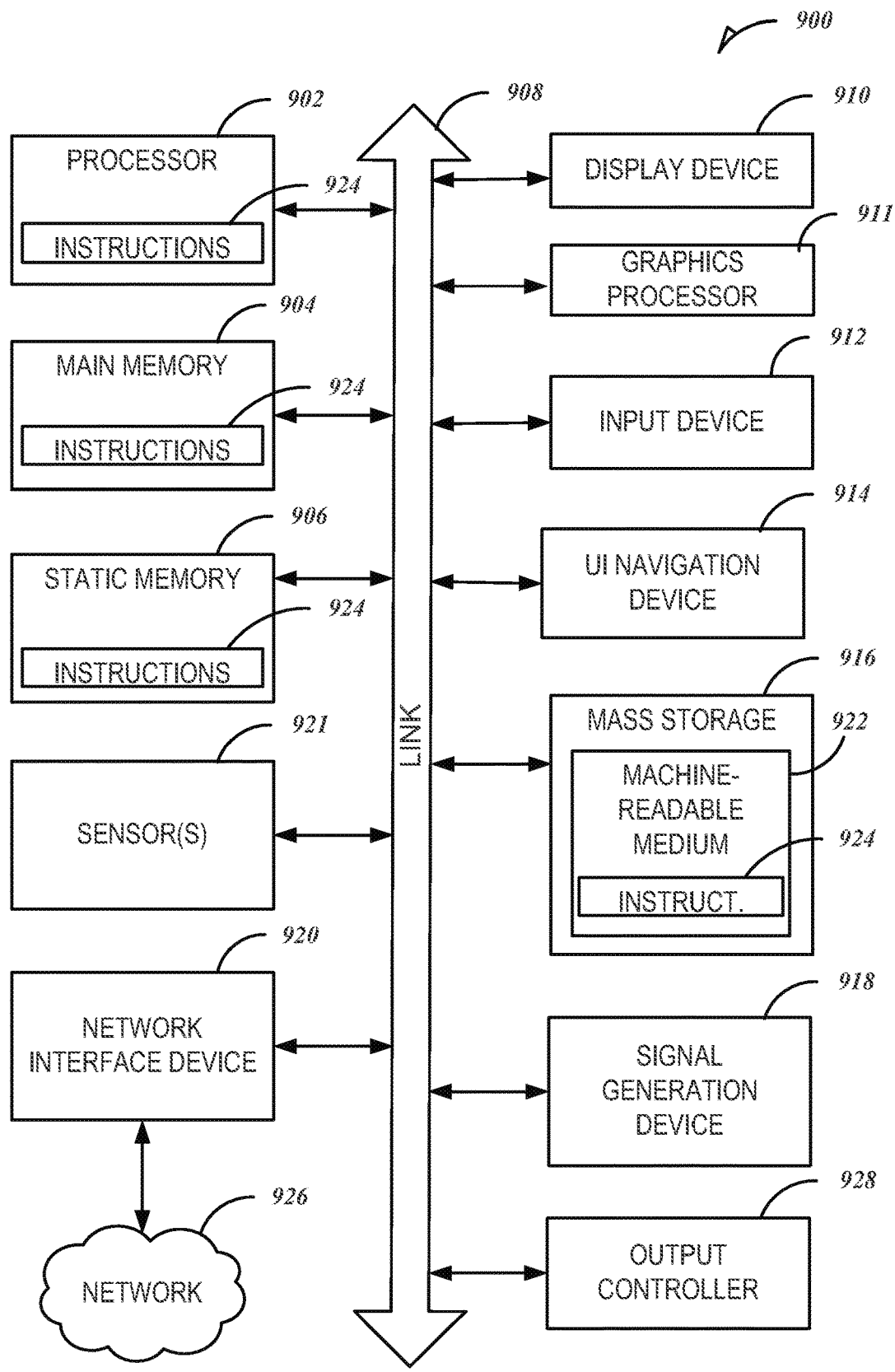
FIG. 5 illustrates a block diagram illustrating an example machine upon which one or more embodiments may be implemented.

FIG. 5 illustrates a block diagram of an example machine 900 upon which any one or more of the techniques (e.g., methodologies) discussed herein may be performed. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a general purpose processor (GPP), a hardware processor core, or any combination thereof), a main memory 904 and a static memory 906, some or all of which may communicate with each other via a link 908. The machine 900 may further include a display unit 910, an application specific processor that includes specific instructions for a specific application, such as hardware decoder or a graphics processing unit (GPU) 911, an alphanumeric input device 912 (e.g., a keyboard), and a user interface (UI) navigation device 914 (e.g., a mouse). In an example, the display unit 910, input device 912, and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine-readable medium 922 is illustrated as a single medium, the term "machine readable medium" may include a single medium or multiple media (e.g., a centralized or distributed database, and/or associated caches and servers) that configured to store the one or more instructions 924.

The term "machine-readable medium" may include any tangible medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include but are not limited to: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

ADDITIONAL NOTES & EXAMPLES

Example 1 includes subject matter (such as a system, an apparatus, a device, a method, a process, etc.) that includes at least one computer-readable medium having computer executable instructions that, when executed on a computing device, cause the computing device to perform a method comprising: receiving, on a computing device including a display and a rendering engine, a frame that includes a graphical element; providing the frame to the rendering engine; determining, in the rendering engine, if the graphical element should be rendered with a general purpose processor (GPP) or an application specific processor based on a criterion; rendering the graphical element with either a general purpose processor or the application specified processor in response to the determination; and presenting the frame with the graphical element on the display.

In Example 2, the subject matter of Example 1 may optionally include switching from a first rendering path utilizing the general purpose processor to a second rendering path utilizing the application specific processor based on an indication by the criterion that a second frame can be rendered more quickly by the application specific processor than by the general purpose processor.

In Example 3, the subject matter of Examples 1 or 2 may optionally include switching from a second rendering path utilizing the application specific processor to a first rendering path utilizing the general purpose processor based on an indication by the criterion that a second frame can be rendered more quickly by the first processor than by the second processor.

In Example 4, the subject matter of Examples 1, 2 or 3 wherein the criterion includes an estimation of a difference between an execution time for rendering the graphical element with the general purpose processor and the application specific processor.

In Example 5, the subject matter of Examples 1, 2, 3 or 4 may optionally include storing a performance indication of the rendering of the graphical element that includes whether the general purpose processor or the application specific processor was utilized on a previous rendering operation.

In Example 6, the subject matter of Examples 1, 2, 3, 4 or 5 wherein the application specific processor is a graphics processing unit (GPU).

In Example 7, the subject matter of Examples 1, 2, 3, 4, 5 or 6 wherein the criterion includes at least one of: a list of application programming interfaces (APIs) to be executed by the graphics processing unit (GPU), a list APIs to be executed by the general purpose processor (GPP), performance characteristics of the GPU, performance characteristics of the GPP, a history of switches between the GPU and the GPP, performance costs of a switch between the GPU and the GPP; a number of instructions required to complete a graphics operation, memory bandwidth, a time to complete an operation, a predicted next operation, or an available number of buffer slots to pipeline commands to graphics hardware.

Example 8 includes subject matter (such as a system, an apparatus, a device, a method, a process, a tangible computer-readable medium having computer executable instructions that, when executed on a computing device, cause the computing device to perform a method, etc.) that perform a method comprising: receiving, on a computing device including a display and a rendering engine, a frame that includes a graphical element; providing the frame to the rendering engine; determining, by the rendering engine, if the graphical element should be rendered with either general purpose processor (GPP) or an application specific processor based on a criterion; rendering the graphical element using the GPP or the application specific processor in response to the determination; and presenting the frame with the graphical element on the display.

In Example 9, the subject matter of Example 8 may optionally include switching from a first rendering path utilizing the GPP to a second rendering path utilizing the application specific processor based on an indication by the criterion that a second frame can be more quickly rendered by the application specific processor.

In Example 10, the subject matter of Examples 8 or 9 may optionally include switching from a second rendering path utilizing the application specific processor to a first rendering path utilizing the GPP based on an indication by the criterion that a second frame can be more quickly rendered by the GPP.

In Example 11, the subject matter of Examples 8, 9 or 10 wherein the criterion includes an estimation of a difference between an execution time for rendering the graphical element with the GPP and the application specific processor.

In Example 12, the subject matter of Examples 8, 9, 10 or 11 may optionally include storing a performance indication of the rendering of the graphical element that includes whether the GPP or the application specific processor was utilized.

In Example 13, the subject matter of Examples 8, 9, 10, 11 or wherein the GPP is a central processing unit and the application specific processor is a graphics processing unit.

In Example 14, the subject matter of Examples 8, 9, 10, 11, 12 or 13 wherein the criterion includes at least one of: a list of application programming interfaces (APIs) to be executed by the graphics processing unit (GPU), a list APIs to be executed by the general purpose processor (GPP), performance characteristics of the GPU, performance characteristics of the GPP, a history of switches between the GPU and the GPP, performance costs of a switch between the GPU and the GPP; a number of instructions required to complete a graphics operation, memory bandwidth, a time to complete an operation, a predicted next operation, or an available number of buffer slots to pipeline commands to graphics hardware.

Example 15 includes subject matter (such as a system, an apparatus, a device, etc.) that includes a display device; a processor configured to receive a plurality of frames containing one or more graphical elements; a graphics processing unit, including a hardware decoder coupled to the display device and communicatively coupled to the processor; and a rendering engine configured to determine, based on a criterion, if a first of the one or more graphical elements can be more efficiently rendered for display on the display device by the processor or the hardware decoder and to dynamically switch between the processor or the hardware decoder for a second of the one or more graphical elements.

In Example 16, the subject matter of Example 15 optionally including a hint generation engine configured to monitor the rendering engine and update the rendering engine with a second criterion for determining if the graphical element can be more efficiently rendered with the processor or the hardware decoder.

In Example 17, the subject matter of Example 15 or 16 wherein the rendering engine is configured to estimate execution times for rendering the one or more graphical elements with the processor and with the hardware decoder.

In Example 18, the subject matter of Example 15, 16 or 17 may optionally include a database module, coupled to the hint generation engine, the database module configured to store a performance indication of the rendering of the graphical element that includes whether the first processor or the second processor was utilized.

In Example 19, the subject matter of Example 15, 16, 17 or 18 wherein the database module is configured to store a performance indication of the rendering of the graphical element that includes the criterion the determination was based on.

In Example 20, the subject matter of Example 15, 16, 17, 18 or 19 wherein the criterion includes at least one of: a list of application programming interfaces (APIs) to be executed by the graphics processing unit (GPU), a list APIs to be executed by the general purpose processor (GPP), performance characteristics of the GPU, performance characteristics of the GPP, a history of switches between the GPU and the GPP, performance costs of a switch between the GPU and the GPP; a number of instructions required to complete a graphics operation, memory bandwidth, a time to complete an operation, a predicted next operation, or an available number of buffer slots to pipeline commands to graphics hardware.

Example 21 includes subject matter (such as a system, an apparatus, a device, a tangible computer-readable medium having computer executable instructions that, when executed on a computing device, cause the computing device to perform a method, etc.) that perform a method comprising: receiving, on a computing device including a rendering engine, a plurality of frames that include a graphical element; rendering a first of the plurality of frames with a central processing unit (CPU); providing the second and subsequent of the plurality of frames to the rendering engine; determining, by the rendering engine, if the second and subsequent of the plurality of frames should be rendered with the CPU or an application specific processor based on a criterion; and rendering the second and subsequent of the plurality of frames using the CPU or the application specific processor in response to the determination.

In Example 22, the subject matter of Example 21 may optionally include wherein the criterion includes an estimation of a difference between an execution time for rendering the graphical element with the CPU and the application specific processor.

In Example 23, the subject matter of Examples 21 or 22 may optionally include wherein the CPU is a general purpose processor (GPP) and the application specific processor is a graphics processing unit (GPU).

In Example 24, the subject matter of Examples 21, 22 or 23 may optionally include wherein the criterion includes at least one of: a list of application programming interfaces (APIs) to be executed by the graphics processing unit (GPU), a list APIs to be executed by the general purpose processor (GPP), performance characteristics of the GPU, performance characteristics of the GPP, a history of switches between the GPU and the GPP, performance costs of a switch between the GPU and the GPP; a number of instructions required to complete a graphics operation, memory bandwidth, a time to complete an operation, a predicted next operation, or an available number of buffer slots to pipeline commands to graphics hardware.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. At least one computer-readable medium having computer executable instructions that, when executed on a computing device, cause the computing device to perform a method comprising:
   accessing, at a rendering engine, a frame that includes a graphical element;
   determining, in the rendering engine, if the frame with the graphical element should be rendered with a central processing unit (CPU) or a graphics processing unit (GPU) based on an estimation of a difference between execution times for rendering the frame with the graphical element with the CPU and the GPU;
   rendering the frame with the graphical element with either the CPU or the GPU in response to the determination;
   presenting the frame with the graphical element on a display; and
   collecting actual performance data of the CPU and the GPU for subsequent rendering.

2. The at least one non-transitory computer-readable medium of claim 1, wherein the GPU is an application specific processor.

3. The at least one non-transitory computer-readable medium of claim 1, further comprising:
   switching from a first rendering path utilizing the CPU to a second rendering path utilizing the GPU.

4. The at least one non-transitory computer-readable medium of claim 3, wherein the switching is based on an indication that a second frame can be rendered more quickly by the GPU than by the CPU.

5. The at least one non-transitory computer-readable medium of claim 1, further comprising:
   switching from a first rendering path utilizing the GPU to a second rendering path utilizing the CPU.

6. The at least one non-transitory computer-readable medium of claim 5, wherein the switching is based on an indication that a second frame can be rendered more quickly by the CPU than by the GPU.

7. The at least one non-transitory computer-readable medium of claim 1, wherein the estimation is based on at least one of: a list of application programming interfaces (APIs) to be executed by the GPU; a list APIs to be executed by the CPU; performance characteristics of the GPU; performance characteristics of the CPU; a history of switches between the GPU and the CPU; performance costs of a switch between the GPU and the CPU; a number of instructions required to complete a graphics operation; memory bandwidth; a time to complete an operation; a predicted next operation; or an available number of buffer slots to pipeline commands to graphics hardware.

8. A method performed by an electronic system, the method comprising:
   receiving, at a rendering engine, a frame that includes a graphical element;
   determining, in the rendering engine, if the frame with the graphical element should be rendered with a central processing unit (CPU) or a graphics processing unit (GPU) based on an estimation of a difference between execution times for rendering the frame with the graphical element with the CPU and the GPU;
   rendering the frame with the graphical element with either the CPU or the GPU in response to the determination;
   presenting the frame with the graphical element on a display; and
   collecting actual performance data of the CPU and the GPU for subsequent rendering.

9. The method of claim 8, wherein the GPU is an application specific processor.

10. The method of claim 8, further comprising:
    switching from a first rendering path utilizing the CPU to a second rendering path utilizing the GPU.

11. The method of claim 10, wherein the switching is based on an indication that a second frame can be rendered more quickly by the GPU than by the CPU.

12. The method of claim 8, further comprising:
    switching from a first rendering path utilizing the GPU to a second rendering path utilizing the CPU.

13. The method of claim 12, wherein the switching is based on an indication that a second frame can be rendered more quickly by the CPU than by the GPU.

14. The method of claim 8, wherein the estimation is based on at least one of: a list of application programming interfaces (APIs) to be executed by the GPU; a list APIs to be executed by the CPU; performance characteristics of the GPU; performance characteristics of the CPU; a history of switches between the GPU and the CPU; performance costs of a switch between the GPU and the CPU; a number of instructions required to complete a graphics operation; memory bandwidth; a time to complete an operation; a predicted next operation; or an available number of buffer slots to pipeline commands to graphics hardware.

15. A hybrid system for graphics rendering comprising:
    a processor configured to receive a plurality of frames containing graphical elements, and to facilitate a first rendering path for selectively rendering the graphical elements;
    a second rendering path communicatively coupled to the processor, the second rendering path configured for selectively rendering the graphical elements, the second rendering path facilitated at least in part by hardware distinct from the processor;

a rendering decision engine to determine, if the graphical elements should be rendered with the first rendering path or the second rendering path based on a prospective comparison of estimations of execution times between the first rendering path and the second rendering path for rendering the graphical elements; and a hint generation module to collect actual performance data of the first rendering path and the second rendering path for subsequent rendering.

16. The system of claim 15, wherein the hardware distinct from the processor is a graphics processing unit (GPU).

17. The system of claim 15, wherein the hardware distinct from the processor is a central processing unit (CPU).

18. The system of claim 15, wherein the prospective comparison of estimations of computational performance between the first rendering path and the second rendering path includes at least one of: a list of application programming interfaces (APIs) to be executed by the second rendering path; a list APIs to be executed by the first rendering path; performance characteristics of the second rendering path; performance characteristics of the first rendering path; a history of switches between the second rendering path and the first rendering path; performance costs of a switch between the second rendering path and the first rendering path; a number of instructions required to complete a graphics operation; memory bandwidth; a time to complete an operation; a predicted next operation; or an available number of buffer slots to pipeline commands to the second rendering path.

* * * * *

UNITED STATES PATENT AND TRADEMARK OFFICE
CERTIFICATE OF CORRECTION

PATENT NO. : 10,726,515 B2  
APPLICATION NO. : 16/025070  
DATED : July 28, 2020  
INVENTOR(S) : Shu et al.

It is certified that error appears in the above-identified patent and that said Letters Patent is hereby corrected as shown below:

In the Claims

In Column 11, Line 35, in Claim 1, after "one", insert --non-transitory--

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*